US011727209B2

(12) United States Patent
Jain et al.

(10) Patent No.: US 11,727,209 B2
(45) Date of Patent: Aug. 15, 2023

(54) SYSTEMS FOR ROLE CLASSIFICATION

(71) Applicant: Adobe Inc., San Jose, CA (US)

(72) Inventors: Ajay Jain, Ghaziabad (IN); Sanjeev Tagra, Redmond, WA (US); Sachin Soni, New Delhi (IN); Niranjan Shivanand Kumbi, Fremont, CA (US); Eric Andrew Kienle, Portland, OR (US); Ajay Awatramani, Fremont, CA (US); Abhishek Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 247 days.

(21) Appl. No.: 16/859,780

(22) Filed: Apr. 27, 2020

(65) Prior Publication Data
US 2021/0334458 A1   Oct. 28, 2021

(51) Int. Cl.
*G06F 40/279* (2020.01)
*G06N 3/08* (2023.01)
*G06N 3/044* (2023.01)

(52) U.S. Cl.
CPC .......... *G06F 40/279* (2020.01); *G06N 3/044* (2023.01); *G06N 3/08* (2013.01)

(58) Field of Classification Search
CPC ....... G06F 40/279; G06N 3/0445; G06N 3/08
See application file for complete search history.

(56) References Cited

U.S. PATENT DOCUMENTS

| | | | | |
|---|---|---|---|---|
| 10,169,315 | B1 * | 1/2019 | Heckel | G06N 3/0481 |
| 2018/0089445 | A1 * | 3/2018 | Ugajin | G06F 21/604 |
| 2018/0374025 | A1 * | 12/2018 | Kotamraju | G06N 20/00 |
| 2019/0303502 | A1 * | 10/2019 | Bastide | G06F 40/197 |
| 2019/0340239 | A1 * | 11/2019 | Boxwell | G06N 3/006 |
| 2020/0050667 | A1 * | 2/2020 | Lin | G06F 16/35 |
| 2020/0073936 | A1 * | 3/2020 | Jankowski | G06F 40/30 |
| 2020/0134019 | A1 * | 4/2020 | Podgorny | G06N 3/0445 |
| 2021/0027018 | A1 * | 1/2021 | Lin | G06N 3/08 |
| 2021/0073631 | A1 * | 3/2021 | Kadayam Viswanathan | G06K 9/6259 |
| 2021/0110411 | A1 * | 4/2021 | Pollak | G06Q 30/0201 |
| 2021/0133509 | A1 * | 5/2021 | Wall | G16H 20/70 |

(Continued)

OTHER PUBLICATIONS

Bisong, "Building Machine Learning and Deep Learning Models on Google Cloud Platform: A Comprehensive Guide for Beginners", Apress, Chapter 20 (Year: 2019).*

(Continued)

*Primary Examiner* — Bhavesh M Mehta
*Assistant Examiner* — Edward Tracy, Jr.
(74) *Attorney, Agent, or Firm* — FIG. 1 Patents

(57) ABSTRACT

In implementations of systems for role classification, a computing device implements a role system to receive data describing a corpus of text that is associated with a user ID. Feature values of features are generated by a first machine learning model by processing the corpus of text, the features representing questions with respect to the corpus of text and the feature values representing answers to the questions included in the corpus of text. A classification of a role is generated by a second machine learning model by processing the feature values, the classification of the role indicating a relationship of the user ID with respect to a product or service. The role system outputs an indication of the classification of the role for display in a user interface of a display device.

20 Claims, 8 Drawing Sheets

(56) References Cited

U.S. PATENT DOCUMENTS

| | | | | |
|---|---|---|---|---|
| 2021/0256069 A1* | 8/2021 | Grail | .................... | G06N 3/04 |
| 2023/0034414 A1* | 2/2023 | Osugi | .................. | G06F 16/90 |

OTHER PUBLICATIONS

Bisong, "Building Machine Learning and Deep Learning Models on Google Cloud Platform: A Comprehensive Guide for Beginners", Chapter 20, 2019 (Year: 2019).*

"Account-based Marketing—Focus on the accounts that matter most using AI", Retrieved at: https://www.marketo.com/software/account-based-marketing/- on Feb. 17, 2020, 14 pages.

"Lead Management Solution—Attract buyers, nurture them, and deliver win-ready leads to sales", Retrieved at: https://www.marketo.com/solutions/lead-management/—on Feb. 17, 2020, 5 pages.

Xiao,"Teach Machine to Comprehend Text and Answer Question with Tensorflow—Part I", Apr. 21, 2018, 16 pages.

* cited by examiner

600

602
Receive data describing a corpus of text that is associated with a user ID

604
Generate feature values of features by a first machine learning model by processing the corpus of text, the features representing questions with respect to the corpus of text and the feature values representing answers to the questions included in the corpus of text

606
Generate a classification of a role by a second machine learning model by processing the feature values, the classification of the role indicating a relationship of the user ID with respect to a product or service

608
Output an indication of the classification of the role for display in a user interface of a display device

*Fig. 6*

SYSTEMS FOR ROLE CLASSIFICATION

BACKGROUND

Digital analytics systems are implemented to analyze "big data" (e.g., petabytes of data) to gain insights that are not possible to obtain solely by human users. In one such example, digital analytics systems are configured to analyze big data to classify client devices which generate and consume portions of the big data through interactions with other client devices. Classification of client devices, for instance, may be used to determine which client devices are likely to increase data consumption, which client devices are likely to decrease data consumption, which client devices are likely to cease data consumption, etc. This can be used to address occurrences of events (e.g., to address spikes in resource usage), resource allocation, and so forth.

In other examples, classifications of client devices may be extended to classify user IDs associated with the client devices. Accurate classification of user IDs associated with client devices may be used to manage provision of digital content and resource allocation by service provider systems and thus improve operation of devices and systems that leverage these classifications. Examples of techniques that leverage classification of user IDs associated with client devices include recommendation systems, digital marketing systems (e.g., to cause conversion of a good or service), systems that rely on user propensity to purchase or cancel a contract relating to a subscription, and so forth. Thus, classification of user IDs associated with client devices may be used by a wide variety of service provider systems for personalization, customer relation/success management, and so forth.

Conventional techniques used by digital analytics systems for classification of client devices, however, are faced with numerous challenges that limit accuracy of the classifications. In one example, accuracy of conventional techniques is limited by generating classifications based solely on numbers of interactions of client devices with digital content. These conventional techniques, for instance, fail to capture the substance of the interactions in making the classifications. As a result, classifications of user IDs associated with client devices generated using conventional systems are often inaccurate which causes operational inefficiencies and other shortcomings for systems and devices that rely on such classifications.

SUMMARY

Systems and techniques are described for role classification. A role defines a function or a purpose for which something is designed or exists and classification of the role defines a relationship of this function or purpose with respect to some other thing A component device's operational role with respect to operation of a computing system could be classified as an input device or an output device of the computing system in one example. For example, a user's role with respect to a product or service may be classified as a champion or a detractor of the product or service, and so forth.

In an example, a computing device implements a role system to receive a corpus of text which includes textual representations of interactions of client devices associated with a user ID. The role system implements a first machine learning model to generate feature values of features by processing the corpus of text. These features are representative of questions with respect to the corpus of text and the corresponding feature values of the features are representative of answers to the questions included in the corpus of text.

The role system implements a second machine learning model to generate a classification of a role by processing the feature values generated by the first machine learning model. In one example, the classification of the role indicates a relationship of the user ID associated with the client devices to a product or service. The relationship may also be instructive, for example, on interventions to increase or decrease a likelihood of an event occurring such as in relation to the product or service.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 6 is a flow diagram depicting a procedure in an example implementation in which data describing a corpus of text that is associated with a user ID is received and an indication of a classification of a role is output for display in a user interface of a display device.

DETAILED DESCRIPTION

Overview

Figure 1:
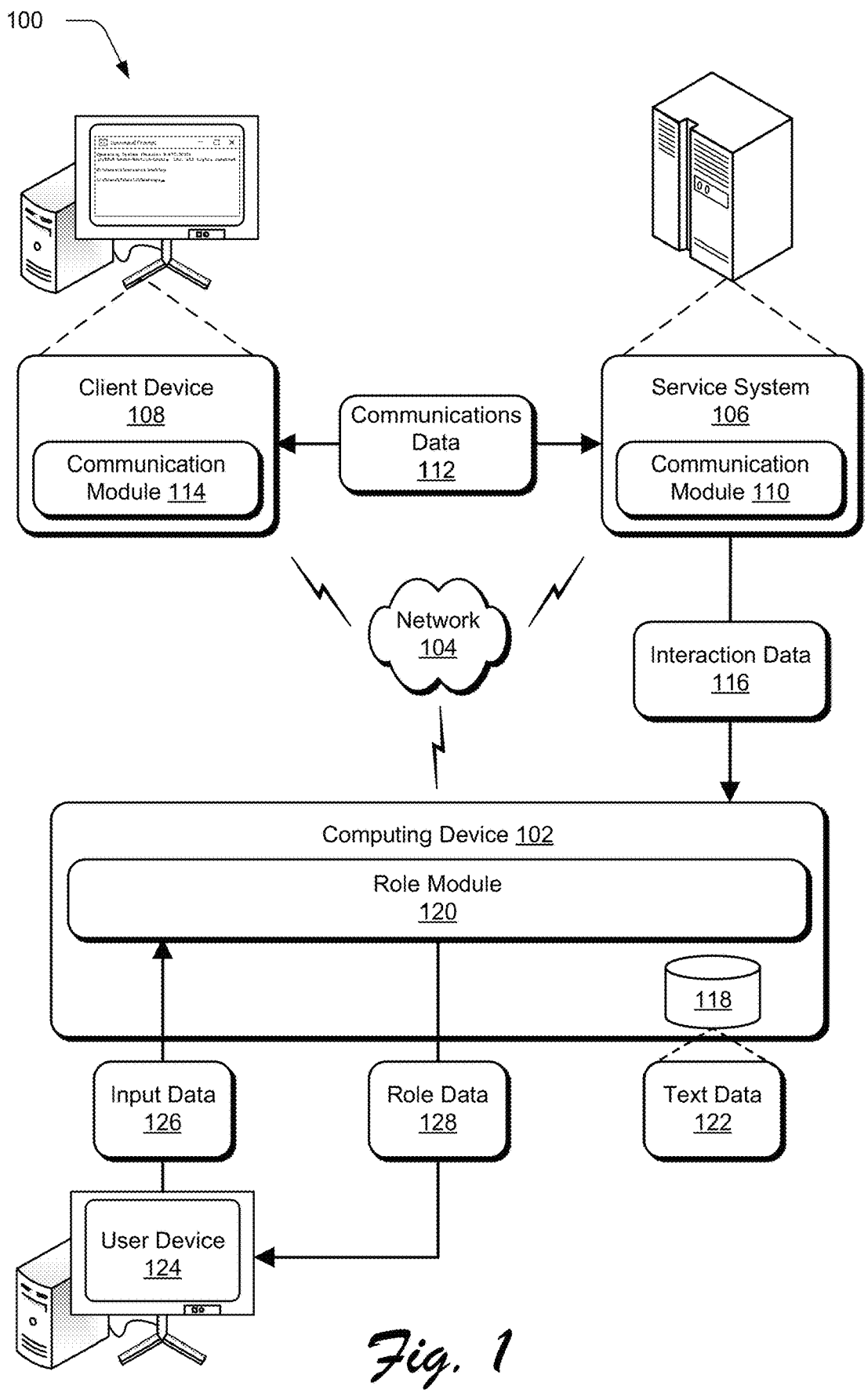
FIG. 1 is an illustration of an environment in an example implementation that is operable to employ digital systems and techniques for role classification as described herein.

A role defines a function or a purpose for which something exists, and classification of the role defines a relationship of this function or purpose with respect to something else. For example, a role of a computing device component may be classified with respect to a computing system as a storage device or a processor device of the computing system. In another example, a role of a user ID may be classified with respect to a product or service as a champion or a detractor of the product or service.

The different types of classifications of the role correspond to different relationships and these relationships can be leveraged in a variety of ways. For example, the computing device component may be more or less likely to fail under certain conditions if the component stores data for the computing system rather than processes data for the computing system. In this example, the likelihood of failure can be leveraged as part of predicting a failure of the computing device component and/or the computing system. Similarly, the user ID may be more or less likely to take an action with respect to the product or service if the user ID is a champion of the product or service rather than a detractor of the product or service which may be leveraged, for example, to determine content of a communication for receipt by a client device associated with the user ID.

Conventional digital analytics systems classify user IDs associated with client devices based on limited amounts of data such as numbers of interactions by the client devices with digital content. Because of the limited data used to classify the user IDs, these conventional systems often fail to accurately classify user IDs associated with the client devices. Accordingly, systems and techniques are described for role classification.

In an example, a computing device implements a role system to receive interaction data describing interactions of client devices associated with a user ID. These interactions can include communications between the client devices and a service system such as communications relating to a product or service. The role system processes the interaction data to generate a corpus of text describing the interactions of the client devices associated with the user ID.

A first machine learning model receives the corpus of text and processes the corpus of text to generate feature values of features. In one example, the first machine learning model includes a long short term memory model for generating the values of the features. The features, for example, represent questions with respect to the corpus of text and the feature values represent answers to the questions included in the corpus of text.

A second machine learning model generates a classification of a role by processing the feature values of the features. For example, the second machine learning model includes a multinomial logistic regression model for generating the classification of the role. The classification of the role indicates a relationship of the user ID associated with the client devices with respect to the product or service.

Examples of the classification of the role include a detractor, a champion, a decision maker, an influencer, and so forth. The role system leverages the classification of the role to form a communication for receipt by the client devices associated with the user ID. For example, the communication includes digital content based on the classification of the role which can increase or decrease a likelihood of an event in relation to the product or service, resource consumption, and so forth.

The described systems and techniques improve computer-based classification technology by using the first machine learning model to generate inputs to the second machine learning model. In one example, the first machine learning model generates the inputs by processing more data than may be possible to process in a digital analytics environment and the second machine learning model processes the inputs as part of the digital analytics environment. This increases accuracy of classifications of roles generated by the second machine learning model compared to conventional techniques which generate classifications using limited data such as a number of interactions by computing devices with digital content. By increasing accuracy of classifications in this way, the described systems improve operational efficiency of devices that rely on these classifications, for example, to generate communications, allocate resources, and so forth.

Term Descriptions

As used herein, the term "role" refers to a function or a purpose for which something is designed or exists.

As used herein, the term "classification of a role" or "role classification" refers to a definition a relationship of the role's function or purpose with respect to some other thing.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

As shown, the illustrated environment 100 includes a service system 106 and a client device 108 which are also connected to the network 104. Although a single service system 106 and a single client device 108 are shown, it is to be understood that the service system 106 may be representative of multiple service systems 106 and the client device 108 can be representative of multiple client devices 108. The service system 106 includes a communication module 110 which the service system 106 implements to transmit and/or receive communications data 112, e.g., via the network 104.

As illustrated, the client device 108 also includes a communication module 114, and the client device 108 implements the communication module 114 to transmit and/or receive the communications data 112 via the network 104. The communications data 112 can describe digital communications such as e-mail communications, video conferencing communications, text message communications, social media communications, etc. These digital communications may be related to a product and/or a service. For example, client device 108 can transmit communications data 112 to the service system 106 requesting information related to a product, and the service system 106 can transmit communications data 112 to the client device 108 which provides the requested information related to the product. In another example, the service system 106 provides a service to the client device 108 and the communications data 112 describes digital communications between the service system 106 and the client device 108 as part of the service.

In one example, the service system 106 may provide a remote data storage service to the client device 108 and the communications data 112 includes interactions between the client device 108 and the remote data storage service. In this example, the communications data 112 can describe usage instances of the storage service such as data uploaded to a cloud-based database. The communications data 112 can also describe communications related to the service such as a request to increase or decrease an amount of remote data storage space available to the client device 108 as part of the service.

The service system 106 transmits interaction data 116 to the computing device 102 via the network 104. The interaction data 116 describes interactions associated with user IDs which may be associated with the client device 108 or multiple client devices 108. For example, the interaction data 116 may describe interactions included in the communications data 112 as well as any other interactions which may be described by data. By way of an example in which a user ID interacts with digital content, the interaction data 116 can describe types of digital content, types of interactions with the digital content, numbers of interactions with the digital content, dates and times of interactions with the digital content, durations of interactions with the digital content, durations between interactions with the digital content, characteristics of devices used to interact with the digital content, channels used to interact with the digital content, whether or not interactions caused other interactions with the digital content, and so forth.

In some examples, the interaction data 116 describes an organization associated with the client device 108 such as whether the organization has an existing association with the service system 106, a type of the organization (e.g., public, private, government, cooperative), a purpose of the organization (e.g., non-profit, joint venture), a size of the organization (e.g., micro, small, medium, large), whether the organization uses a particular product and/or service (e.g., a product and/or service of the service system 106, a product and/or service that is competitive to a product and/or service offered by the service system 106), whether the organization has previous positive or negative experience with the particular product and/or service, and so forth. The interaction data 116 can also include information relating to a user ID associated with the client device 108 such as a designation of the user ID, whether the user ID is associated with an upper-management position, a number of times the user ID has visited a particular website, an amount of time the user ID spends on a particular website, types of content interacted with by the user ID (e.g., technical, business, strategy, upcoming events), a number of meetings between the user ID and the service system 106, an amount of time the user ID spends in communication sessions (e.g., telecommunication sessions, online conference sessions), a number of e-mail communications sent by the user ID, a number of e-mail communications received by the user ID, an average time between responses by the user ID, etc. The interaction data 116 may also describe aspects of speech included in the communications data 112 such as a tone of speech, a sentiment of speech, a vocabulary included in speech, and so forth.

As shown, the computing device 102 includes a storage device 118 and a role module 120. The computing device 102 implements the role module 120 to receive the interaction data 116 and the role module 120 processes the interaction data 116 to generate text data 122. The role module 120 generates the text data 122 such that the text data 122 is organized by user ID. In this way, each user ID included in the interaction data 116 is associated with a corpus of text describing interactions associated with the user ID. Each corpus of text, for example, includes textual representations of interactions by a corresponding user ID such as a combination of e-mail communications, transcripts of communication sessions, etc.

A user device 124 transmits input data 126 to the computing device 102 that defines a user ID for role classification. The role module 120 receives that input data 126 and accesses the text data 122 to retrieve a corpus of text associated with the user ID. The role model 120 processes the corpus of text retrieved from the text data 122 to generate a classification of a role. The classification of the role indicates a relationship of the user ID with respect to a product or service and the role module 120 generates role data 128 describing the classification of the role. Examples of the classification of the role include a detractor, a champion, a decision maker, an influencer, and so forth. In one example, the relationship of the user ID with respect to the product or service can be used to increase or decrease a likelihood of an action related to the product or service. The role module 120 transmits the role data 128 to the user device 124 which processes the role data 128 to generate an indication of the classification of the role.

Figure 2:
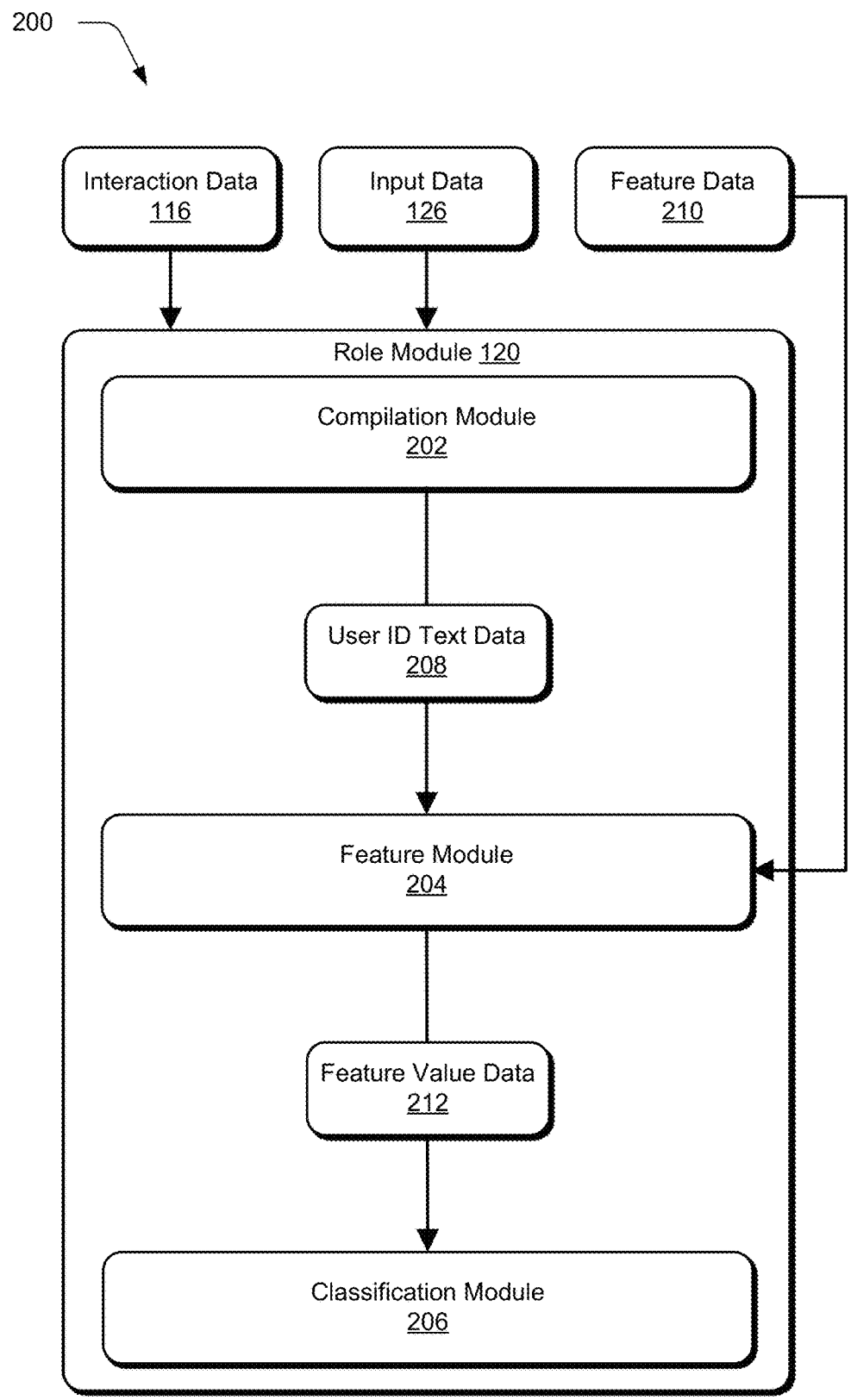
FIG. 2 depicts a system in an example implementation showing operation of a role module for role classification.

FIG. 2 depicts a system 200 in an example implementation showing operation of a role module 120. The role module 120 is illustrated to include a compilation module 202, a feature module 204, and a classification module 206. For example, the compilation module 202 receives the interaction data 116 and the input data 126 and processes the interaction data 116 and the input data 126 to generate user ID text data 208. In one example, the compilation module 202 processes the interaction data 116 to generate the text data 122 in substantially real time as the interaction data 116 is received by the computing device 102.

In another example, the input data 126 defines a user ID for role classification and the compilation module 202 accesses the text data 122 to extract a corpus of text associated with the user ID. The compilation module 202 generates the user ID text data 208 as describing the corpus of text associated with the user ID. In an example in which the input data 126 defines multiple user IDs for role classification, the compilation module 202 accesses the text data 122 and extracts a corpus of text associated with each user ID defined in the input data 126. In this example, the compilation module 202 generates the user ID text data 208 as describing the corpus of text associated with each user ID of the multiple user IDs.

The feature module 204 receives the user ID text data 208 and feature data 210 and processes the user ID text data 208 and the feature data 210 to generate feature value data 212. For example, the feature data 210 describes features and the feature module 204 processes the user ID text data 208 to determine values for the features. The feature module 204 can include a machine learning model such as a long short term memory model, and the computing device 102 implements the feature module 204 to process the corpus of text associated with the user ID using the features to determine the values for the features.

In one example, the feature data 210 describes questions and the feature module 204 extracts answers to the questions from the corpus of text as the feature values. The feature module then 204 generates the feature value data 212 as describing the feature values. Consider an example in which the feature data 210 describes a feature as a question with respect to the corpus of text. In this example, the question is an average amount of time between communications.

Accordingly, the feature is the average amount of time between communications by a client device 108 associated with the user ID.

The value for this feature is determined by processing the user ID text data 208 using the machine learning model of the feature module 204. For example, the feature module 204 determines that the average amount of time between communications by the client device 108 associated with the user ID is 300 units of time. Thus, the feature value for the feature of the average amount of time between communications is 300 and the feature module 204 generates the feature value data 212 to describe 300 as the feature value in this example.

The classification module 206 receives the feature value data 212 and processes the feature value data 212 to generate the role data 128. For example, the classification module 206 also includes a machine learning module such as a logistic regression model, and the classification module 206 processes the feature value data 212 using the machine learning model to generate a classification of a role. The classification of the role indicates a relationship of the user ID with respect to a product or service and the classification module 206 generates the role data 128 as describing the classification of the role. In one example, the classification module 206 generates the role data 128 as describing the classification of the role as a detractor, a champion, a decision maker, an influencer, etc.

The role module 120 transmits the role data 128 to the user device 124 which processes the role data 128 to generate an indication of the classification of the role. For example, the user device 124 forms a communication for receipt by the client device 108 based on the classification of the role. This communication can include digital content such as digital content that is selected from other digital content based on the classification of the role. In one example, the classification of the role is a detractor and the communication includes digital content which highlights a product differentiation, a price effectiveness of a product, etc.

Figure 3:
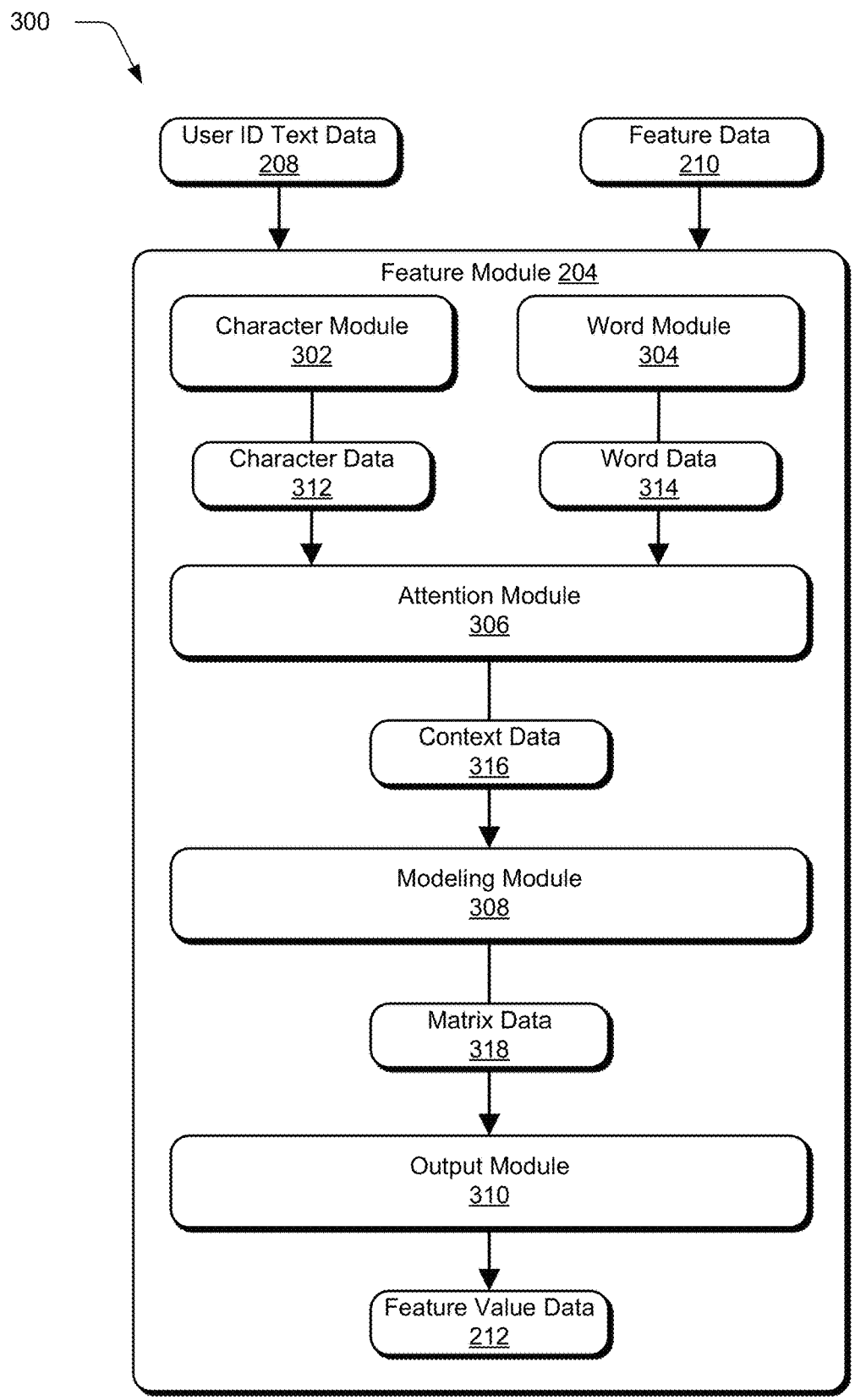
FIG. 3 depicts a system in an example implementation showing operation of a feature module.

FIG. 3 depicts a system 300 in an example implementation showing operation of a feature module 204. The feature module 204 is illustrated to include a character module 302, a word module 304, an attention module 306, a modeling module 308, and an output module 310. As shown, both the character module 302 and the word module 304 receive the user ID text data 208 and the feature data 210. For example, the character module 302 includes a character embedding layer and the word module 304 includes a word embedding layer such as Global Vectors for Word Representation (GloVe). The character module 302 receives words described by the user ID text data 208 from the corpus of text and the character module 302 also receives words described by the feature data 210 from the questions with respect to the corpus of text. Similarly, the word module 304 receives words from the corpus of text described by the user ID text data 208 and words from the questions with respect to the corpus of text described by the feature data 210.

The character module 302 embeds the user ID text data 208 and the feature data 210 as a vector at a character level and the word module 304 embeds the user ID text data 208 and the feature data 210 as a vector at a word level. By using both character level embedding and word level embedding in this example, the feature module 204 can make predictions for words described by the user ID text data 208 and the feature data 210 that are accurate for words which are uncommon, misspelled, include sentiment, include tone, and so forth. As illustrated, the character module 302 processes the user ID text data 208 and the feature data 210 to generate character data 312 which can describe a fixed character embedding vector. The word module 304 processes the user ID text data 208 and the feature data 210 to generate word data 314 which describes a fixed word embedding vector in one example.

The attention module 306 receives the character data 312 and the word data 314 and processes the character data 312 and the word data 314 to generate context data 316. For example, the attention module 306 includes a two layer highway network which learns semantic representations from the character data 312 and the word data 314. The attention module 306 also includes a contextual embedding layer which concatenates output vectors and captures interaction among context words included in the corpus of text. Thus, an output from the two layer highway network may be input to the contextual embedding layer. In one example, the contextual embedding layer employs bidirectional long short term memory systems which can make predictions for a particular word based on characters and/or words before the particular word and based on characters and/or words after the particular word.

The attention module 306 can also include an attention flow layer such that an output of the contextual embedding layer is input to the attention flow layer. For example, the attention flow layer computes bidirectional attention between the corpus of text and the questions with respect to the corpus of text. Thus, the attention flow layer computes attention from the corpus of text described by the user ID text data 208 to the questions with respect to the corpus of text described by the feature data 210. The attention flow layer also computes attention from the questions described by the feature data 210 to the corpus of text described by the user ID text data 208. In this manner, the attention flow layer of the attention module 306 fuses and links information described by the user ID text data 208 and information described by the feature data 210.

The attention flow layer generates a question aware representation of each word of the corpus of text, and the attention module 306 generates the context data 316 as describing these question aware representations. The modeling module 308 receives the context data 316 and processes the context data 316 to generate matrix data 318. For example, the modeling module 308 uses bidirectional long short term memory systems as part of concatenating output vectors. In this way, the modeling module 308 captures interaction among words of the corpus of text conditional to the words of the questions with respect to the corpus of text. In an example in which the feature module 204 employs both character level embedding and word level embedding, the modeling module 308 captures interaction among words which are misspelled, are in different languages, uncommon, etc.

In an example, the contextual embedding layer of the attention module 306 receives two "d" dimensional vectors from the two layer highway network and the contextual embedding layer outputs two "2d" dimensional vectors. The modeling module 308 receives the two "2d" dimensional vectors and concatenates these two "2d" dimensional vectors into an output matrix. The modeling module 308 generates the matrix data 318 as describing the output matrix in this example.

The output module 310 receives the matrix data 318 and processes the matrix data 318 to generate the feature value data 212. To do so in one example, the output module 310 calculates a probability of each word included in the corpus of text as being a start index or an end index of an answer to a question with respect to the corpus of text. For example, the output module 310 uses Softmax to calculate the probabilities and the output module 310 generates the feature value data 212 as describing these probabilities. Thus, the feature module 204 receives the user ID text data 208 which describes the corpus of text and the feature data 210 which describes the questions with respect to the corpus of text and the feature module 204 generates the feature value data 212 as describing answers to the questions based on the corpus of text.

Figure 4:
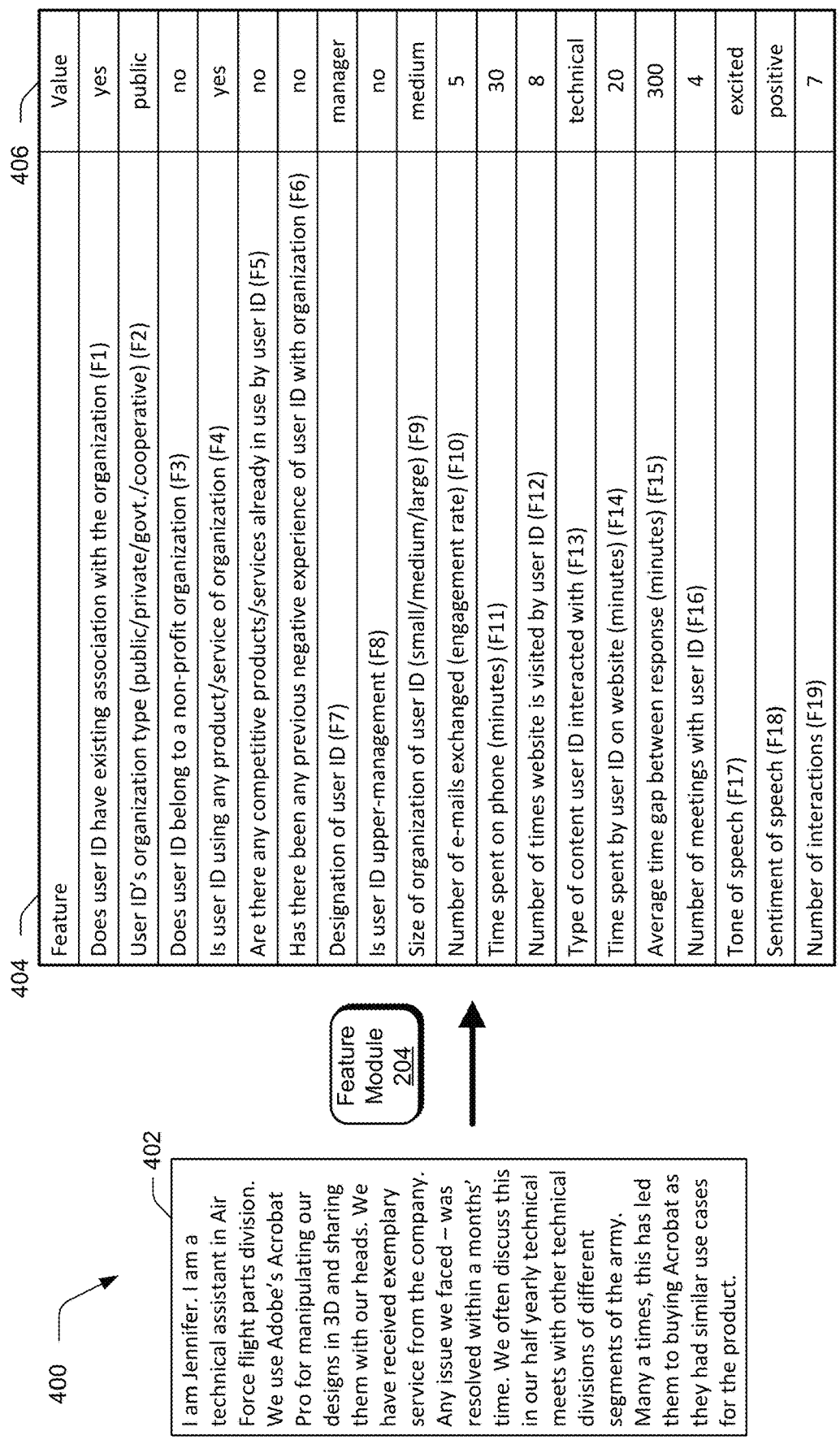
FIG. 4 illustrates an example representation of generation of feature values based on a corpus of text and features.

FIG. 4 illustrates an example representation 400 of generation of feature values based on a corpus of text and features. The representation 400 includes a corpus of text 402 and features 404 which are represented as questions with respect to the corpus of text 402. For example, the user ID text data 208 describes the corpus of text 402 and the feature data 210 describes the features 404. The feature module 204 processes the corpus of text 402 and the features 404 to generate feature values 406.

As shown, the corpus of text 402 includes text of interactions associated with a user ID and the features 404 include features F1-F19. For example, the user ID is associated with the client device 108 and the role module 120 generates the corpus of text 402 from interactions of the user ID described by the interaction data 116. The feature data 210 describes features F1-F19 in one example.

Feature F1 is a question with respect to the corpus of text 402. In this example, F1 asks "Does user ID have existing association with the organization" and the feature module 204 processes the corpus of text 402 to determine an answer to the question asked by feature F1. The feature module 204 uses both character embedding and word embedding for the corpus of text 402 and the features 404 as part of the long short term memory model. In this manner, the feature module 204 determines that a feature value for feature F1 is "yes." The feature module 204 generates the feature value for feature F1 as "yes."

As shown, the feature value for feature F1 is not explicitly included in the corpus of text 402 in this example. For example, the feature module 204 can generate the feature values of the features F1-F19 based on probabilities of start and end indexes for the words included in the corpus of text 402. The feature module 204 can also generate the feature values of the features F1-F19 based on a semantic context of the words included in the corpus of text 402. In this example, the feature module 204 generates the feature value for feature F1 as "yes" because the substance of the corpus of text 402 indicates that the user ID has an existing relationship with the organization.

Feature F2 asks "User ID's organization type" and includes examples of public, private, government, and cooperative. The feature module 204 processes the corpus of text 402 to determine an answer to the question asked by feature F2. As shown, the feature module 204 determines a feature value for feature F2 is "public" using the long short term memory model. The feature module 204 generates the feature value for feature F2 as "public."

Feature F3 asks "Does user ID belong to a non-profit organization" and the feature module 204 determines a feature value for feature F3 is "no." Accordingly, the feature module 204 generates the feature value for feature F3 as "no." Feature F4 asks "Is user ID using any product/service of organization." The feature module 204 uses the long short term memory model and generates a feature value for feature F4 as "yes." Similarly, feature F5 asks "Are there any competitive products/services already in use by user ID" and the feature module 204 generates a feature value for feature F5 as "no."

As illustrated, feature F6 asks "Has there been any previous negative experience of user ID with organization." The feature module 204 determines that a feature value for feature F6 is "no" and the feature module 204 generates the feature value for feature F6 as "no." Feature F7 asks "Designation of user ID" and the feature module 204 generates a feature value for feature F7 as "manager." Feature F8 asks "Is user ID upper-management." The feature module 204 generates a feature value for feature F8 as "no."

The feature module 204 continues to process the corpus of text 402 and the features 404 to generate the feature values 406. Feature F9 asks "Size of organization of user ID" and also includes examples of small, medium, and large. The feature module 204 generates a feature value for feature F9 as "medium." Feature F10 asks "Number of e-mails exchanged" and the feature module 204 generates a feature value for feature F10 as "5." As shown, feature F11 asks "Time spent on phone" and the feature module 204 generates a feature value for feature F11 as "30."

As illustrated in FIG. 4, feature F12 asks "Number of times website is visited by user ID." The feature module 204 processes the corpus of text 402 and determines that a feature value for feature F12 is "8." Thus, the feature module 204 generates the feature value for feature F12 as "8." Feature F13 asks "Type of content user ID interacted with" and the feature module 204 generates a feature value for feature F13 as "technical." Feature F14 asks "Time spent by user ID on website." The feature module generates a feature value for feature F14 as "20."

As illustrated, feature F15 asks "Average time gap between response" and the feature module 204 generates a feature value for feature F15 as "300." Similarly, feature F16 asks "Number of meetings with user ID." The feature module 204 generates a feature value for feature F16 as "4." Feature F17 asks "Tone of speech" and the feature module generates "excited" as a feature value for feature F17. Feature F18 asks "Sentiment of speech." The feature module 204 generates a feature value for feature F18 as "positive." Feature F19 asks "Number of interactions" and the feature module 204 generates a feature value of "7" for feature F19.

Figure 5:
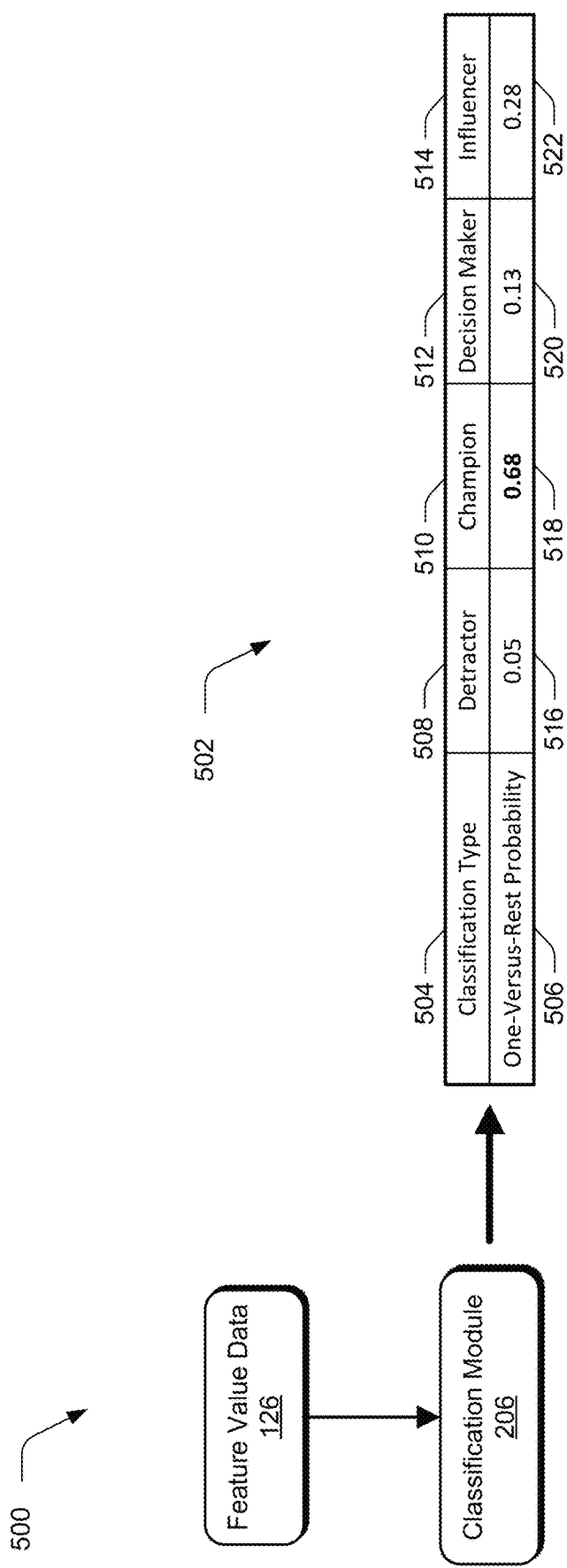
FIG. 5 illustrates an example representation of generation of a classification of a role based on feature values described by feature value data.

FIG. 5 illustrates an example representation 500 of generation of a classification of a role based on feature values described by feature value data. The representation 500 includes the classification module 206 which receives the feature value data 126 and generates an indication 502. In one example, the classification module 206 generates the indication 502 using the logistic regression model which can be a multinomial logistic regression model. The indication 502 includes a category of classification type 504 as well as a category of one-versus-rest probability 506. The classification module 206 uses the logistic regression model to generate a one-versus-rest probability 506 for each classification type 504.

As shown, classification type 508 is "detractor," classification type 510 is "champion," classification type 512 is "decision maker," and classification type 514 is "influencer." The classification module 206 generates probability 516 as being 0.05 for detractor 508 and probability 518 as being 0.68 for champion 510. Similarly, the classification module 206 generates probability 520 as 0.13 for decision maker 512 and probability 522 as 0.28 for influencer 514. By way of comparison, champion 510 has the highest one-versus-rest probability 506 and champion 510 is the classified role.

A comparison of the substance of the corpus of text 402 to the classification types 504 suggests that champion 510 is indeed the role of the user ID. For example, the corpus of text 402 indicates that the user ID has "received exemplary service" and therefore the role of the user ID has a low probability of detractor 508. The corpus of text 402 also indicates that the user ID is an "assistant" so the role of the user ID also has a low probability of decision maker 512. The substance of the corpus of text 402 further indicates that the user ID is aware of other user IDs using the product or service so the role of the user ID has a higher probability of influencer 514 than detractor 508 and decision maker 512. However, the substance of the corpus of text 402 primarily indicates that the user ID is a supporter and promoter of the product or service so the role of the user ID has a highest probability of champion 510 in this example.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-5. FIG. 6 is a flow diagram depicting a procedure 600 in an example implementation in which data describing a corpus of text that is associated with a user ID is received and an indication of a classification of a role is output for display in a user interface of a display device. Data describing a corpus of text that is associated with a user ID is received (block 602). The computing device 102 implements the role module 120 to receive the data describing the corpus of text in one example.

Feature values of features are generated (block 604) by a first machine learning model by processing the corpus of text, the features representing questions with respect to the corpus of text and the feature values representing answers to the questions included in the corpus of text. For example, the role module 120 generates the feature values using the first machine learning model. A classification of a role is generated (block 606) by a second machine learning model by processing the feature values, the classification of the role indicating a relationship of the user ID with respect to a product or service. The role module 120 can generate the classification of the role using the second machine learning model. An indication of the classification of the role is output (block 608) for display in a user interface of a display device. The computing device 102 implements the role module 120 to output the indication.

Figure 7:
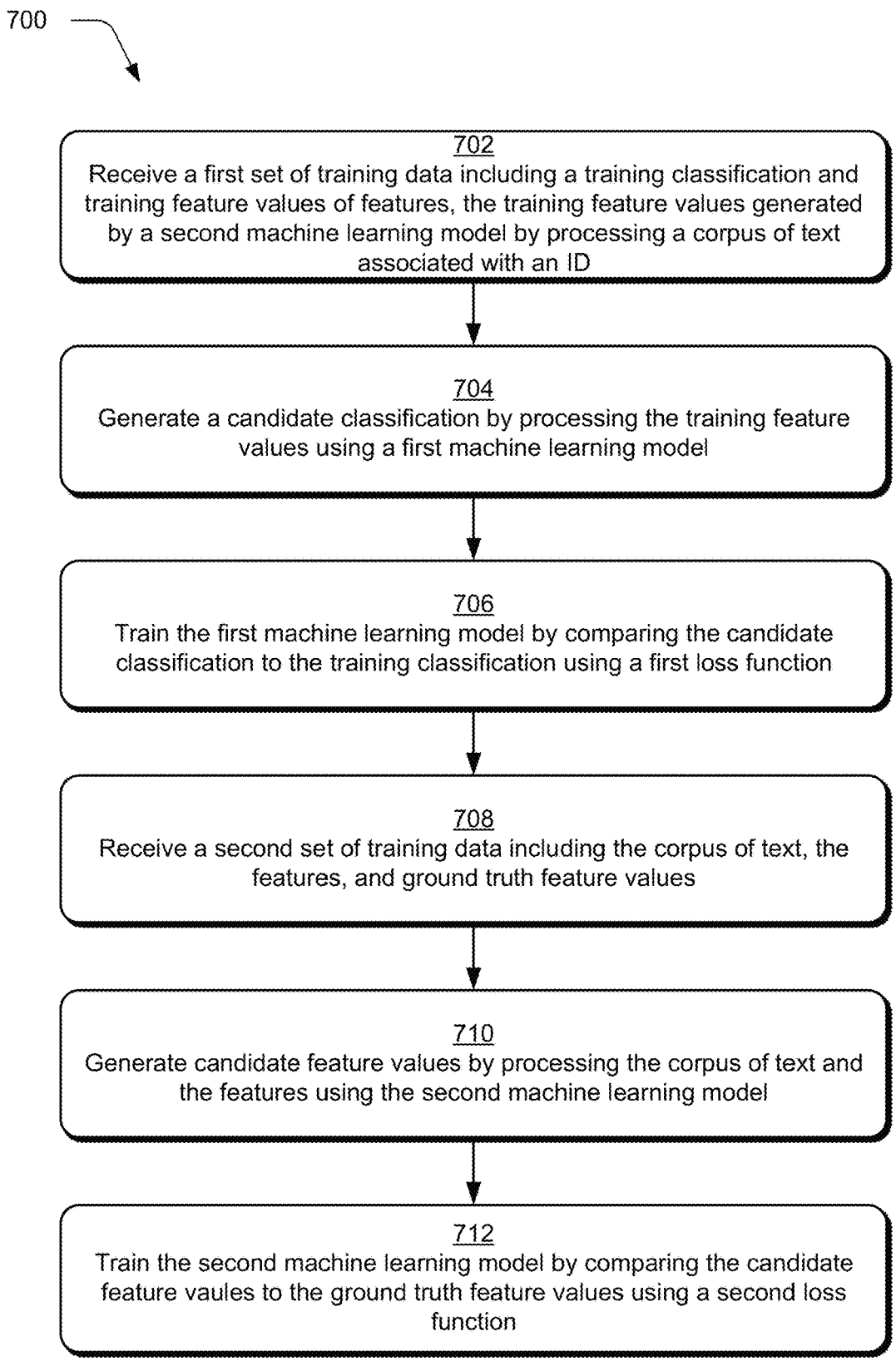
FIG. 7 is a flow diagram depicting a procedure in an example implementation in which a first machine learning model is trained for role classification.

FIG. 7 is a flow diagram depicting a procedure 700 in an example implementation in which a first machine learning model is trained for role classification. A first set of training data including a training classification and training feature values of features is received (block 702), the training feature values generated by a second machine learning model by processing a corpus of text associated with an ID. The computing device 102 implements the role module 120 to receive the first set of training data in one example. A classification is generated (block 704) by processing the training feature values using a first machine learning model. For example, the role module 120 generates the classification using the first machine learning model.

The first machine learning model is trained (block 706) by comparing the candidate classification to the training classification using a first loss function. The role module 120 can train the first machine learning model. A second set of training data including the corpus of text, the feature, and ground truth feature values is received (block 708). The computing device 102 implements the role module 120 to receive the second set of training data in one example.

Candidate feature values are generated (block 710) by processing the corpus of text and the features using the second machine learning model. For example, the role module 120 can generate the candidate features using the second machine learning model. The second machine learning model is trained (block 712) by comparing the candidate feature values to the ground truth feature values using a second loss function. In one example, the computing device 102 implements the role module 120 to train the second machine learning model.

Example System and Device

Figure 8:
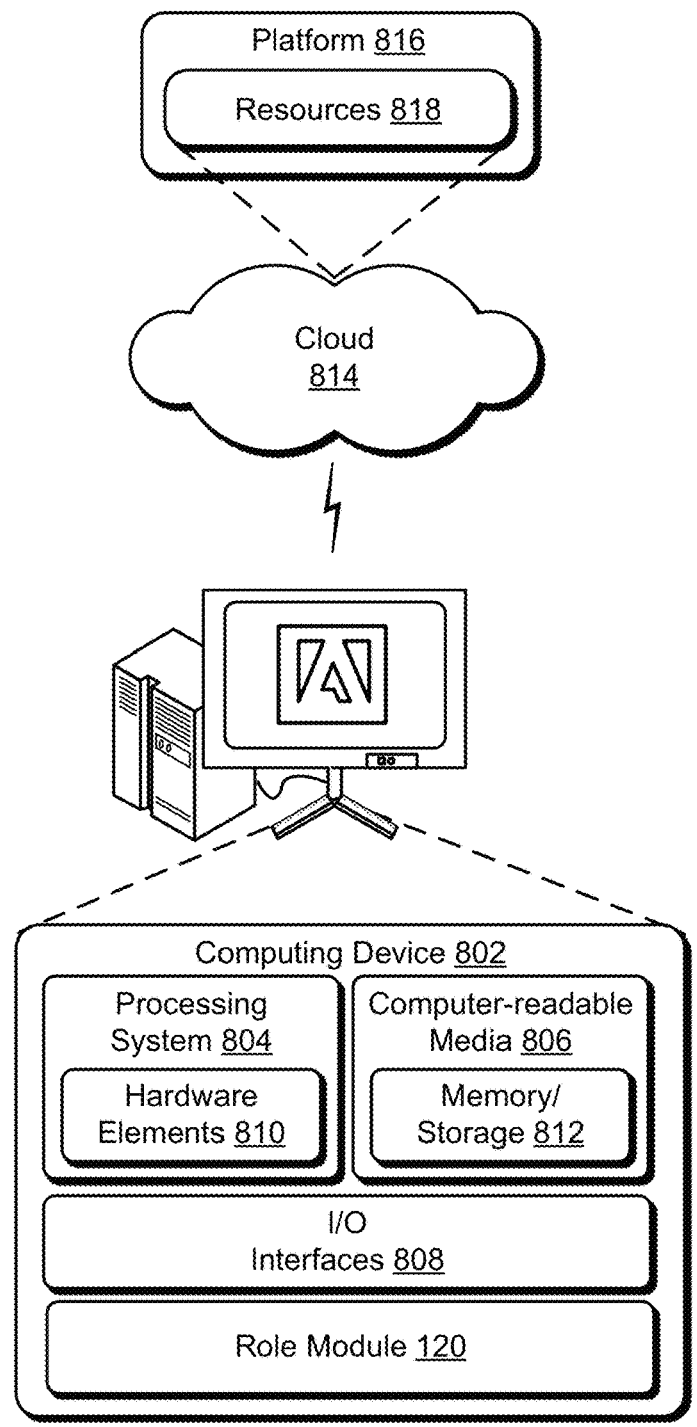
FIG. 8 illustrates an example system that includes an example computing device that is representative of one or more computing systems and/or devices that may implement the various techniques described herein.

FIG. 8 illustrates an example system 800 that includes an example computing device that is representative of one or more computing systems and/or devices that may implement the various techniques described herein. This is illustrated through inclusion of the role module 120. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources 818 and functions to connect the computing device 802 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although implementations of systems for role classification have been described in language specific to structural features and/or methods, it is to be understood that the appended claims are not necessarily limited to the specific features or methods described. Rather, the specific features and methods are disclosed as example implementations of systems for role classification, and other equivalent features and methods are intended to be within the scope of the appended claims. Further, various different examples are described and it is to be appreciated that each described example can be implemented independently or in connection with one or more other described examples.

What is claimed is:

1. A method comprising:
   receiving, by a processing device, interaction data describing interactions of client devices associated with a user ID, the interactions including communications relating to a product or service between the client devices and a service system;
   generating, by the processing device, a corpus of text that is associated with the user ID based on the interaction data;
   computing, by the processing device, feature values of features using a first machine learning model by processing the corpus of text using both character level embeddings and word level embeddings for the corpus of text, the features representing questions with respect to the corpus of text and the feature values representing answers to the questions extracted from the corpus of text;
   generating, by the processing device, question aware representations using a two layer highway network, a contextual embedding layer, and an attention flow layer of the first machine learning model based on the character level embeddings, the word level embeddings, and the features, each of the question aware representations indicates a probability of a word included in the corpus of text being included in an answer of the answers to the questions, an input to the contextual embedding layer is output from the two layer highway network and an input to the attention flow layer is output from the contextual embedding layer;
   generating, by the processing device, a classification of a role using a second machine learning model by processing the feature values and the question aware representations, the classification of the role indicating a relationship of the user ID with respect to the product or service; and
   outputting, by the processing device, an indication of the classification of the role for display in a user interface of a display device.

2. The method as described in claim 1, further comprising receiving a user input defining the user ID, the user input received via the user interface.

3. The method as described in claim 1, wherein the first machine learning model includes a long short term memory model.

4. The method as described in claim 1, wherein the second machine learning model includes a logistic regression model.

5. The method as described in claim 1, wherein the classification of the role is at least one of a decision maker, a champion, a detractor, or an influencer.

6. The method as described in claim 1, wherein the indication includes a one-versus-rest probability.

7. The method as described in claim 1, further comprising forming a communication for receipt by a client device associated with the user ID, the communication including digital content based on the classification of the role.

8. The method as described in claim 1, wherein the features include a sentiment of text included in the corpus of text and a tone of text included in the corpus of text.

9. A system comprising:
   a memory component; and
   a processing device coupled to the memory component, the processing device to perform operations comprising:
      receiving a first set of training data including a training classification and training feature values of features, the training features values generated by a first machine learning model by processing a corpus of text associated with an ID using both character level embeddings and word level embeddings for the corpus of text and the training classification is indicative of a relationship of the ID with respect to a product or service;
      generating question aware representations using a two layer highway network, a contextual embedding layer, and an attention flow layer of the first machine learning model based on the character level embeddings, the word level embeddings, and the features, each of the question aware representations indicates a probability of a word included in the corpus of text being included in an answer to a question with respect to the corpus of text, an input to the contextual embedding layer is output from the two layer highway network and an input to the attention flow layer is output from the contextual embedding layer;
      generating a candidate classification by processing the training feature values and the question aware representations using a second first machine learning model; and
      training the second machine learning model by comparing the candidate classification to the training classification using a first loss function.

10. The system as described in claim 9, wherein the operations further comprise:
   receiving a second set of training data including the corpus of text, the features, and ground truth feature values;
   generating candidate feature values by processing the corpus of text and the features using the first machine learning model; and training the first machine learning model by comparing the candidate feature values to the ground truth feature values using a second loss function.

11. The system as described in claim 9, wherein the candidate classification is at least one of a decision maker, a champion, a detractor, or an influencer.

12. The system as described in claim 9, wherein the ID is a client device ID.

13. The system as described in claim 9, wherein the second machine learning model includes a logistic regression model and the first machine learning model includes a long short term memory model.

14. A non-transitory computer-readable storage medium storing executable instructions, which when executed by a processing device, cause the processing device to perform operations comprising:
   receiving a user input defining a user ID for role classification;
   compiling a corpus of text associated with the user ID;
   computing feature values of features using a first machine learning model by processing the corpus of text using both character level embeddings and word level embeddings for the corpus of text, the features representing questions with respect to the corpus of text and the feature values representing answers to the questions extracted from the corpus of text;
   generating question aware representations using a two layer highway network, a contextual embedding layer, and an attention flow layer of the first machine learning model based on the character level embeddings, the word level embeddings, and the features, each of the question aware representations indicates a probability of a word included in the corpus of text being included in an answer of the answers to the questions, an input to the contextual embedding layer is output from the two layer highway network and an input to the attention flow layer is output from the contextual embedding layer;
   generating a classification of a role using a second machine learning model by processing the feature values and the question aware representations, the classification of the role indicating a relationship of the user ID with respect to a product or service; and
   outputting an indication of the classification of the role for display in a user interface.

15. The non-transitory computer-readable storage medium as described in claim 14, wherein the classification of the role is at least one of a decision maker, a champion, a detractor, or an influencer.

16. The non-transitory computer-readable storage medium as described in claim 14, wherein the indication includes a one-versus-rest probability.

17. The non-transitory computer-readable storage medium as described in claim 14, wherein the first machine learning model includes a long short term memory model.

18. The non-transitory computer-readable storage medium as described in claim 14, wherein the second machine learning model includes a logistic regression model.

19. The non-transitory computer-readable storage medium as described in claim 14, wherein the operations further comprise forming a communication for receipt by a client device associated with the user ID, the communication including digital content based on the classification of the role.

20. The non-transitory computer-readable storage medium as described in claim 14, wherein the features include a sentiment of text included in the corpus of text and a tone of text included in the corpus of text.

* * * * *

UNITED STATES PATENT AND TRADEMARK OFFICE
CERTIFICATE OF CORRECTION

| | |
|---|---|
| PATENT NO. | : 11,727,209 B2 |
| APPLICATION NO. | : 16/859780 |
| DATED | : August 15, 2023 |
| INVENTOR(S) | : Ajay Jain et al. |

It is certified that error appears in the above-identified patent and that said Letters Patent is hereby corrected as shown below:

In the Claims

Column 16, Line 55, after "representations using a second", delete "first".

Signed and Sealed this
Twenty-fourth Day of October, 2023

*Katherine Kelly Vidal*

Katherine Kelly Vidal
*Director of the United States Patent and Trademark Office*